(12) United States Patent
Menge et al.

(10) Patent No.: US 8,158,952 B2
(45) Date of Patent: Apr. 17, 2012

(54) SCINTILLATION DETECTOR AND METHOD OF ASSEMBLING AND TESTING

(75) Inventors: Peter R. Menge, Chagrin Falls, OH (US); Michael Kusner, Auburn Township, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 317 days.

(21) Appl. No.: 12/466,025

(22) Filed: May 14, 2009

(65) Prior Publication Data

US 2009/0283687 A1   Nov. 19, 2009

Related U.S. Application Data

(60) Provisional application No. 61/054,369, filed on May 19, 2008.

(51) Int. Cl.
*G01T 1/20* (2006.01)
(52) U.S. Cl. .................................. 250/370.11
(58) Field of Classification Search ............. 250/370.11; 436/1
See application file for complete search history.

(56) References Cited

U.S. PATENT DOCUMENTS

| 4,764,677 | A | 8/1988 | Spurney |
| 5,625,141 | A | 4/1997 | Mahoney et al. |
| 6,646,821 | B2 | 11/2003 | Bernett et al. |

FOREIGN PATENT DOCUMENTS

EP    1860419 A1    11/2007

OTHER PUBLICATIONS

MIL-STD-202G, Method 112E, Oct. 11, 1998, pp. 1-14.*

* cited by examiner

*Primary Examiner* — David Porta
*Assistant Examiner* — Christine Sung
(74) *Attorney, Agent, or Firm* — Abel Law Group, LLP; Robert T. Conway

(57) ABSTRACT

A method of assembling a scintillation detector including placing a scintillator crystal in a casing, and forming a sealed casing having a controlled atmosphere different than ambient atmosphere, wherein the controlled atmosphere includes an inert gas and a trace gas in an amount of at least about 1 vol % and not greater than about 30 vol %, wherein the trace gas is selected from the group of materials consisting of hydrogen, helium, neon, krypton, xenon, and carbon monoxide. The assembling method further includes testing the sealed casing for leaks by detecting the presence of the trace gas.

18 Claims, 2 Drawing Sheets

SCINTILLATION DETECTOR AND METHOD OF ASSEMBLING AND TESTING

CROSS-REFERENCE TO RELATED APPLICATION(S)

The present application claims priority from U.S. Provisional Patent Application No. 61/054,369, filed May 19, 2008, entitled "Scintillation Detector and Method of Assembling and Testing," naming inventor Peter R. Menge, which application is incorporated by reference herein in its entirety.

BACKGROUND

1. Field of the Disclosure

The present disclosure is directed to scintillation devices and methods of assembling such devices, and more particularly directed to ruggedized scintillation detectors for industrial applications.

2. Description of the Related Art

Scintillation detectors have been employed in various industrial applications, such as the oil and gas industry for well logging. Typically, these detectors have scintillator crystals made of an activated sodium iodide material that is effective for detecting gamma rays. Generally, the scintillator crystals are enclosed in tubes or casings, which include a window permitting radiation-induced scintillation light to pass out of the crystal package for measurement by a light-sensing device such as a photomultiplier tube. The photomultiplier tube converts the light photons emitted from the crystal into electrical pulses that are shaped and digitized by associated electronics that may be registered as counts and transmitted to analyzing equipment.

However, the incorporation of scintillator crystals in industrial applications is difficult, as scintillator crystals are very sensitive components. For example, exposure of the crystal to contaminants, such as water vapor, can result in degradation of light output by the crystal reducing the effectiveness and lifetime of the scintillation detector. Exposure of the scintillator crystal to extreme vibrations can result in false counts and inaccurate measurements. Additionally, exposure to extreme temperatures, and rapid temperature changes can affect the light output of the scintillator crystal resulting in incorrect measurements.

As such, while certain designs for scintillation detectors have been utilized with success, the industry continues to demand improved scintillation detectors capable of withstanding the harsh environments encountered in various industrial applications, with particularly desirable performance.

SUMMARY

According to a first aspect a method of assembling a scintillation detector includes placing a scintillator crystal in a casing, and forming a sealed casing having a controlled atmosphere that is different than ambient atmosphere, the controlled atmosphere including an inert gas and a trace gas in an amount of at least about 1 vol % not greater than about 30 vol %, wherein the trace gas selected from the group of materials consisting of hydrogen, helium, neon, krypton, xenon, and carbon monoxide. The method further includes testing the sealed casing for leaks by detecting the presence of the trace gas.

According to one embodiment, the method can further include placing a reflector within the casing and around at least a portion of the scintillator crystal. According to another embodiment, the method further includes placing a shock absorbing member within the casing and around at least a portion of the reflector and the scintillator crystal.

In one embodiment, the method can further include sealing a first end of the casing with a cap that includes a window. In accordance with another example, sealing can further include sealing a second cap to a second end of the housing opposite the first end. In certain conditions, sealing the first end and the second end is completed in a sealed workbox having a same atmosphere as the controlled atmosphere within the sealed casing. In some instances, sealing can include welding or brazing, or even electron beam welding for applications in which the sealing is done in a sealed workbox having a reduced pressure atmosphere.

In another example, the method further includes testing the sealed casing for leaks after forming the sealed casing. In one particular instance, testing includes placing the sealed casing in a testing chamber having a controlled environment, and analyzing the controlled environment for the presence of the trace gas.

According to one embodiment, forming a sealed casing having a controlled atmosphere includes forming a scintillation detector sub-assembly comprising a casing and a scintillator crystal, reflector, and a shock absorbing member within the casing, and placing the sub-assembly within a sealed workbox. Such processing conditions can further include providing a controlled atmosphere within the sealed workbox, wherein the controlled atmosphere includes a trace gas selected from the group of materials consisting of hydrogen, helium, neon, krypton, xenon, and carbon monoxide, and sealing the sub-assembly within the controlled atmosphere to form a sealed casing having the same controlled atmosphere as the controlled atmosphere within the sealed workbox.

In accordance with another aspect, a scintillation detector includes a sealed casing comprising a controlled atmosphere different than ambient atmosphere, the controlled atmosphere including argon in an amount of not less than about 70 vol % and helium in an amount of at least about 1 vol % and not greater than about 30 vol %, wherein the trace gas selected from the group of materials consisting of hydrogen, helium, neon, krypton, xenon, and carbon monoxide, and a scintillator crystal disposed within the sealed casing.

In one example, the controlled atmosphere can have a reduced pressure of not greater than about 100 Torr. In another particular instance, the controlled atmosphere has a reduced pressure of not greater than about 1 Torr, such as within a range between about 10 mTorr and about 100 Torr.

In certain conditions, the controlled atmosphere comprises at least about 5 vol % of helium, such as at least about 10 vol %, 15 vol %, or 20 vol %. In one particular condition, the controlled atmosphere contains helium in an amount between about 1 vol % and about 25 vol %, and more particularly within a range between about 1 vol % and 10 vol %. In one particular embodiment, the controlled atmosphere consists essentially of argon and helium.

In certain conditions, the scintillation detector further includes a shock absorbing member within the sealed casing and substantially surrounding the scintillator crystal. In still other examples, the shock absorbing member comprises a polymer material. Additionally, the scintillation detector can include a reflector disposed between the scintillator crystal and the shock absorbing member and substantially surrounding the scintillator crystal. The reflector in certain conditions can include a fluorinated polymer. Other components within the scintillation detector can include a sleeve substantially surrounding the shock absorbing member, wherein the sleeve is in a compressed state and exerts a radially compressive force on the shock absorbing member and the scintillator crystal. Another component of the scintillation detector is a window connected to an end of the sealed casing. In other instances, the scintillation detector can include an interface pad within the sealed casing and adjacent to the scintillator crystal. Moreover, the scintillation detector can be coupled to a photomultiplier tube, and may further incorporate a light pipe disposed between the scintillation detector and the photomultiplier tube. The light pipe can be coupled to the photomultiplier tube and the scintillation detector using biasing members.

In one embodiment of the first aspect, the scintillator crystal includes an activated crystalline material, such as a sodium iodide or a rare-earth halide crystalline material. For example, in one particular embodiment, the scintillator crystal can be thallium activated sodium iodide. Still, in other instances, the scintillator crystal can be an activated rare-earth halide, such as $LaBr_3$, $LaCl_3$, $LuI_3$, $GdI_3$, $GdBr_3$. Certain activators can include elements such as cerium, neodymium, thallium, europium, or praseodymium.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Numerous innovative teachings of the present application will be described with particular reference to exemplary embodiments. However, it should be understood that this class of embodiments provides only a few examples of the many advantageous uses of the innovative teachings herein. In general, statements made in the specification of the present application do not necessarily limit any of the various claimed articles, systems or methods. Moreover, some statements may apply to some inventive features but not to others.

A scintillation detector is disclosed that is suitable for use in extreme environments. In particular, according to embodiments disclosed herein, the detector is designed and assembled to provide notably desirable performance under challenging conditions, including industrial applications that potentially expose the scintillator crystal to extreme temperature changes, contaminants, and shock.

Figure 1:
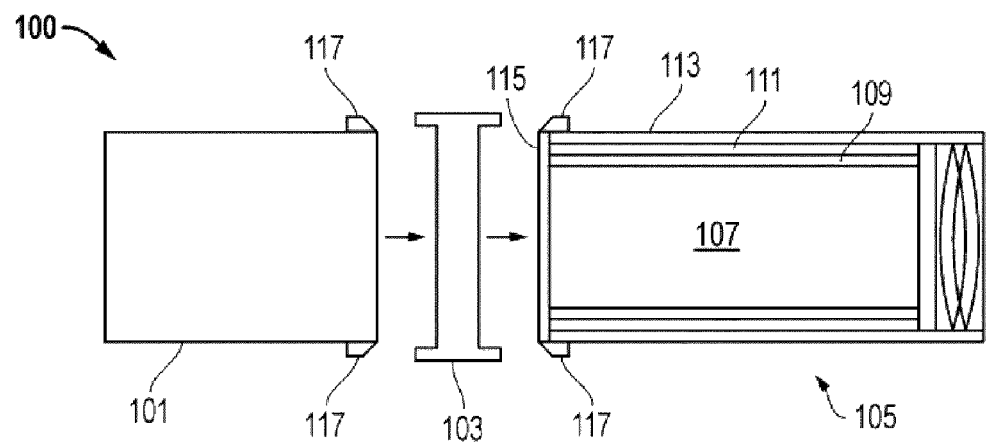
FIG. 1 includes an illustration of a radiation detector according to one embodiment.

FIG. 1 illustrates a scintillation detector 100 according to one embodiment. As illustrated, the scintillation detector includes a photosensor 101, light pipe 103, and a housing 105. As mentioned above, the housing 105 can include a scintillator crystal 107 disposed within and substantially surrounded by a reflector 109 and a shock absorbing member 111. The scintillator crystal 107, reflector 109, and the shock absorbing member 111 are housed within a casing 113 which includes a window 115 at one end of the casing 113.

The photosensor 101 can be a device capable of spectral detection and resolution, such as a photomultiplier tube or other detection device. The photons emitted by the scintillator crystal 107 are transmitted through the window 115 of the housing 105, through the light pipe 103, to the photosensor 101. As is understood in the art, the photosensor 101 provides a count of the photons detected, which provides data on the radiation detected by the scintillator crystal. The photosensor 101 can be housed within a tube or housing made of a material capable of withstanding and protecting the electronics of the photosensor 101, such as a metal, metal alloy or the like. Various materials can be provided with the photosensor 101, such as within the detection device housing, to stabilize the detection device during use and ensure proper optical coupling between the light pipe 103 and the housing 105.

As illustrated, the light pipe 103 is disposed between the photosensor 101 and the housing 105. The light pipe 103 can facilitate optical coupling between the photosensor 101 and the housing 105. According to one embodiment, the light pipe 103 can be coupled to the housing 105 and the photosensor 101 using biasing members 117 that provide a spring resiliency. Such biasing members 117 can facilitate absorption of shocks to the detector 100 which can reduce false readings and counts during use of the device. As will be appreciated, the biasing members can be used in conjunction with other known coupling methods such as the use of an optical gel or bonding agent.

Figure 2:
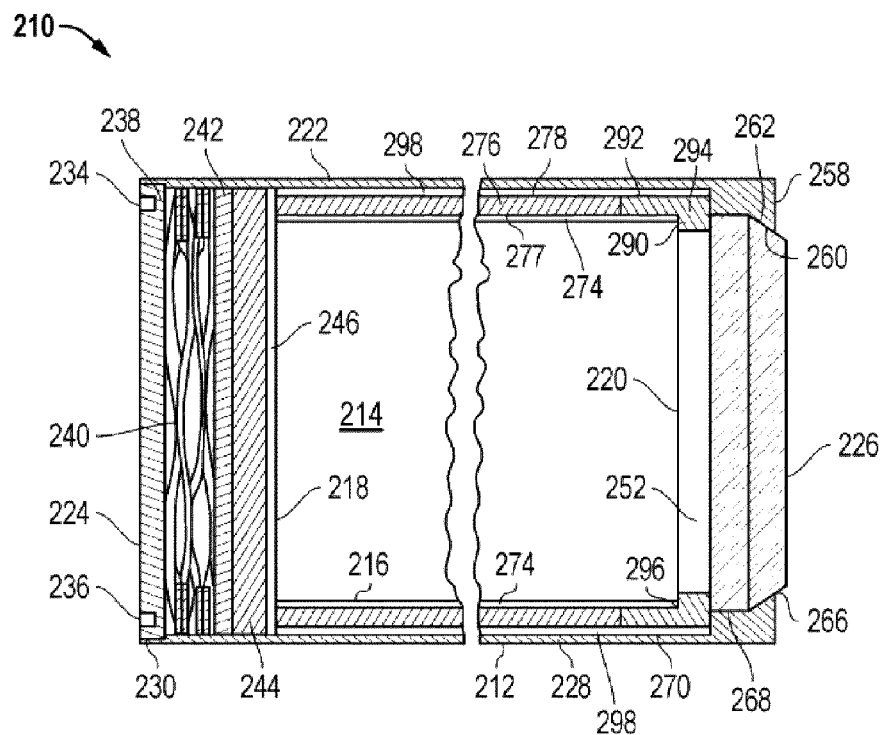
FIG. 2 includes a cross-sectional illustration of a scintillation detector according to one embodiment.

In further reference to the scintillation device, FIG. 2 provides an illustration of a scintillation detector 210 according to one embodiment. The scintillation detector 210 includes a scintillator crystal 214 disposed within a housing 212. According to one embodiment, the scintillator crystal 214 can be an activated iodide crystal. In more particular embodiments, the scintillator crystal 214 is a thallium-activated sodium iodide crystal. In certain other embodiments, the scintillator crystal 214 can be an activated halide crystal, including for example, activated $LaBr_3$, $LaCl_3$, $LuI_3$, $GdI_3$, $GdBr_3$. Particular activating species include cerium, thallium, praseodymium, europium, and neodymium.

The scintillator crystal 214 can have various shapes, such as a rectangular shape, or a cylindrical surface 216 as illustrated including flat end faces 218 and 220. It will be appreciated that the surface finish of the scintillator crystal 214 can be sanded, polished, ground, etc., as desired.

In further reference to FIG. 2, the housing 212 can include a casing 222 that can be cylindrical or tubular to effectively fit the selected geometry of the scintillator crystal 214. The casing 222 can be closed at its rear end by a back cap 224 and at its front end by a front cap that may include an optical window 226. Alternatively, the casing 222 can be sealed at the front end by using only the optical window. The optical window 226 can include a material that is transmissive to scintillation light given off by the scintillator crystal 214. According to one embodiment, the optical window 226 is made of crown glass. The casing 222 and back cap 224 can be made of a non-transmissive material, such as a metal, metal alloy, or the like. As such, in one embodiment, the casing 222 and the back cap are made of stainless steel or aluminum. The back cap 224 can be coupled to the casing 222 using a sealant, mechanical fasteners, or by a vacuum type peripheral weld. According to a particular embodiment, the casing 222 can have a recess in the casing wall to form a welding flange 230, which facilitates fitting the back cap 224. Additionally, the back cap 224 can include an opening to its outer side such that annular grooves 234 and 236 are spaced slightly inwardly from the circumferential edge. Welding is performed at the outer ends of the welding flange 230 and the reduced thickness of a connecting portion 238 of welding flange 230 reduces welding heat, conducting heat away from the welding flanges to permit formation of a desired weld.

The scintillation detector 210 further includes a biasing member 240, a backing plate 242, a cushion pad 244, and an end reflector 246. The biasing member 240, can include a spring, as illustrated, or other suitable resilient biasing members. The biasing member 240 functions to axially load the crystal and bias it towards the optical window 226. Other suitable biasing members can include but are not limited to, coil springs, resilient pads, pneumatic devices or even devices incorporating a semi-compressible liquid or gel. As such, suitable materials for the biasing member 240 can include a metal, a metal alloy, polymers, or the like.

The backing plate 242 disperses the force of the biasing member 240 across the area of the cushion pad 244 for substantially uniform application of pressure and axial loading of the rear face 218 of the scintillator crystal 214. Alternatively, the backing plate and biasing member may be integrated into a single structure, such as in the case of an elastomeric polymer member, which may have a rigid reinforcement layer. The cushion pad 244 can typically be made of a resilient material such as a polymer, particularly an elastomer, such as, a silicone rubber. The thickness of the cushion pad 244 can vary within a range of about 1.5 mm to about 8.0 mm for most crystals.

Additionally, the cushion pad 244 can be adjacent to an end reflector 246. A porous reflective material may facilitate the escape of air or gas from between the reflector film and crystal face and can avoid pockets of trapped air or gas which could prevent the end reflector 246 from being pushed by the cushion pad 244 flat against the rear end face 218 of the scintillator crystal 214 which can have a negative impact on reflectivity at the reflector-crystal interface. The reflector material may be approximately 0.25 mm thick. According to particular embodiment, the reflecting material is a film that can be wrapped at least once around the crystal and possibly two or more times as desired. Alternatively, the end reflector 246 can be a metal foil disk, which conforms to the surface of the crystal end face 218 and provides suitable reflectance toward the optical window 226.

The end reflector 246 can include a suitable reflecting material such as a powder, like aluminum oxide (alumina) powder, or a reflective tape or foil such as, a white porous PTFE material (Teflon™). In accordance with a particular embodiment, the end reflector 246 is a monolithic and preformed piece of material containing a fluorinated polymer. In one embodiment, the fluorinated polymer can include a fluorine substituted olefin polymer comprising at least one monomer selected from the group consisting of vinylidene fluoride, vinylfluoride, tetrafluoroethylene, hexafluoropropylene, trifluoroethylene, chlorotrifluoroethylele, ethylene-chlorotrifluoroethylene, and mixtures of such fluoropolymers. In one particular embodiment, the end reflector 246 is made essentially of a fluorinated polymer. In another more particular embodiment, the end reflector 246 is made essentially of polytetrafluoroethylene (PTFE).

As indicated above, the biasing member 240 exerts a force on the scintillator crystal 214, to urge the scintillator crystal 214 towards the optical window 226 thereby maintaining suitable optical coupling between the scintillation crystal 214 and the optical window 226. An optional layer 252 (or interface pad) can be provided between the scintillator crystal 214 and the optical window 226 to facilitate effective optical coupling. According to one embodiment, the interface pad 252 can include a transparent polymer material, such as a transparent silicone elastomer. The thickness of the interface pad 252 can be within a range of about 1.5 mm to about 8 mm for most crystals.

In further reference to FIG. 2, the optical window 226 can be retained in the casing 222 by an annular lip 258 at the front end of the casing 222. The annular lip 258 can protrude radially inwardly from the casing wall 228 and can define an opening having a diameter less than the diameter of the optical window 226. Additionally, the annular lip 258 can have an inner beveled surface 260 and the optical window 226 can include a corresponding beveled, circumferential edge surface 262 that engages the inner beveled surface 260. The mating beveled surfaces can be hermetically sealed by a high temperature solder such as 95/5 or 90/10 lead/tin solder. The solder also aids in restraining the optical window 226 against axial push-out, in addition to providing a high temperature seal. The optical window 226 can be axially trapped between the annular lip 258 and the scintillator crystal 214 such that it can be radially constrained by the casing wall 222. Optionally, to permit wetting of the optical window 226 by the solder, the sealing edge surfaces of the optical window 226 can include a metalized coating such as platinum.

According to the illustrated embodiment of FIG. 2, the inner beveled surface 260 can forwardly terminate at a cylindrical surface 266 and rearwardly at a cylindrical surface 268. The cylindrical surface 268 closely surrounds a portion of the optical window 226 and extends axially inwardly to a cylindrical surface 270, which extends axially to the flange 230 at the opposite end of the casing 222. The interface of the optical window 226 is aligned with the annular shoulder formed between the cylindrical surfaces 268 and 270.

According to another embodiment, the scintillator crystal 214 can be substantially surrounded by a reflector 274. The reflector 274 can incorporate materials as described above in accordance with the end reflector 246, such as a porous material including a powder, foil, metal coating, or polymer coating. According to one embodiment, the reflector 274 is a layer of aluminum oxide (alumina) powder. In another embodiment, the reflector 274 is a fluorinated polymer, and more particularly a self-adhering PTFE material (Teflon™). As noted above, air or gas that might otherwise be trapped between the end reflector 246 and the scintillator crystal 214 may escape through the porous reflector 274.

In addition to the reflector 274 surrounding the scintillator crystal 214, a shock absorbing member 276, can substantially surround the scintillator crystal 214. The shock absorbing member 276 can surround and exert a radial force on the reflector 274 and the scintillator crystal 214. As shown, the shock absorbing member 276 can be cylindrical to accompany the selected shape of the scintillator crystal 214. The shock absorbing member 276 can be made of a resiliently compressible material and according to one embodiment, is a polymer, such as an elastomer.

In accordance with a particular embodiment, the shock absorbing member 276 is a preformed sheet containing a fluorinated polymer. In one embodiment, the fluorinated polymer can include a fluorine substituted olefin polymer comprising at least one monomer selected from the group consisting of vinylidene fluoride, vinylfluoride, tetrafluoroethylene, hexafluoropropylene, trifluoroethylene, chlorotrifluoroethylele, ethylene-chlorotrifluoroethylene, and mixtures of such fluoropolymers. In one particular embodiment, the shock absorbing member 276 is made essentially of a fluorinated polymer. In another more particular embodiment, the shock absorbing member 276 is made essentially of polytetrafluoroethylene (PTFE).

Additionally, the surface contour of the shock absorbing member 276 can vary along the length to provide a frictionally engaging surface thereby enhancing the stabilization of the scintillator crystal 214 within the casing 222. For example, the shock absorbing member 276 can have a uniform inner surface 277 and an outer surface 278, or optionally, can have ribs extending axially or circumferentially on the inner surface 277, the outer surface 278, or both. Still, the shock absorbing member 276 can have protrusions, dimples, or other shaped irregularities on the inner surface 277, the outer surface 278, or both surfaces to frictionally engage the scintillator crystal 214 and the casing 222. The shock absorbing member is discussed in more detail below.

As also illustrated, the scintillation detector 210 can include a ring 290 that extends from the front end of the shock absorbing member 276 to the optical window 226. The ring 290 facilitates stabilization and alignment of the circular interface pad 252 during assembly of the scintillation detector 210. The ring 290 has an axially inner end portion 292 substantially surrounding the scintillator crystal 214 and an axially outer end portion 294 substantially surrounding the interface pad 252. The intersection of the interior surfaces of the axially inner end portion 292 and the axially outer end portion 294 can include a shoulder 296, which facilitates positioning of the ring 290 on the scintillator crystal 214 during assembly.

In certain embodiments, the ring 290 can be made of resilient material, including an organic material, such as an elastomer. In one particular embodiment, the ring 290 is in direct contact with the inner surface of the casing 222 and the outer surface of the scintillator crystal 214, but may not necessarily provide a hermetically sealing interface between the scintillator crystal 214 and the shock absorbing member 276, such as relying on an interference fit between the crystal 214 and the and the shock absorbing member 276.

Moreover, the ring 290 can include additional materials, generally located within the inner surface and abutting the scintillator crystal 214 to enhance the reflection of the ring 290. Such materials can include, for example, alumina or PTFE (Teflon™). The ring 290 and the shock absorbing member may alternatively be integrated together as a continuous integral component.

In further reference to the components of the scintillation detector 210 as illustrated in FIG. 2, a sleeve 298 extends longitudinally from the optical window 226 to approximately the back cap 224. The sleeve 298 can substantially surround the shock absorbing member 276 and scintillator crystal 214 and in a compressed state (when fitted within the casing 222) provides a radially compressive force to the shock absorbing member 276 and scintillator crystal 214. According to one embodiment, insertion of the sleeve 298 into the casing 222 requires compression of the sleeve thereby providing a radially compressive force on the crystal 214. Suitable materials for the sleeve 98 include resilient materials, such as a metal, metal alloy, a polymer, carbon or the like. Additionally, the sleeve 298 can include a material that has a lower coefficient of friction with the material of the casing 222 than does the material of the shock absorbing member 276 with the material of the casing 222.

In accordance with one particular aspect, the scintillation detector 210 includes a sealed casing 222, which can include a controlled atmosphere contained within that is different than the ambient atmosphere, otherwise air. The controlled atmosphere can include a particular mixture of an inert gas and a trace gas, facilitating the detection of leaks, among other things. In certain embodiments, the controlled atmosphere can consist essentially of the inert gas and the trace gas.

With respect to the trace gas, certain suitable trace gases can include hydrogen, helium, neon, krypton, xenon, and carbon monoxide. In some embodiments, it is suitable to use a less-reactive gas, particularly in industrial applications, and accordingly trace gases such as helium, krypton, and xenon may be used. In still more particular embodiments, the trace gas is helium. Additionally, it will be appreciated that a mixture of one or more of the trace gases may also be included in the controlled atmosphere.

The particular content of trace gas within the controlled atmosphere facilitates, improved sealing of the assembly, leak detection, and superior thermal conductivity characteristics lending to improved detector performance. The particular mixture of the controlled atmosphere can include not greater than about 30 vol % of the trace gas. As such, in more particular embodiments, the controlled atmosphere includes between about 1 vol % and about 25 vol % trace gas, such as between 1 vol % and about 15 vol %, or even between 1 vol % and about 10 vol %.

In regards to the inert gas, generally suitable inert gases can include nitrogen, any of the noble gases or a combination thereof. In accordance with one particular embodiment, the inert gas in the controlled atmosphere is argon. Likewise, as described in accordance with the amounts of the trace gas, such percentages In certain embodiments, the amount of the inert gas is within a range between 75 vol % and about 99 vol %, such as between about 80 vol % and about 99 vol %, or even between 90 vol % and about 99 vol %.

In further reference to the controlled atmosphere within the sealed casing 222, in accordance with one embodiment, the controlled atmosphere can have a reduced pressure that is less than standard atmospheric pressure (1 atm. or 760 Torr). A reduced pressure atmosphere may provide an atmosphere having a suitable thermal conductivity appropriate for reducing damage and increasing lifetime of the scintillation detector. As such, in one embodiment, the controlled atmosphere has a pressure of not greater than about 100 Torr, such as not greater than about 1 Torr, not greater than about 10 mTorr. In one particular embodiment, the controlled atmosphere has a pressure within a range between about 100 Torr and about 10 mTorr.

Figure 3:
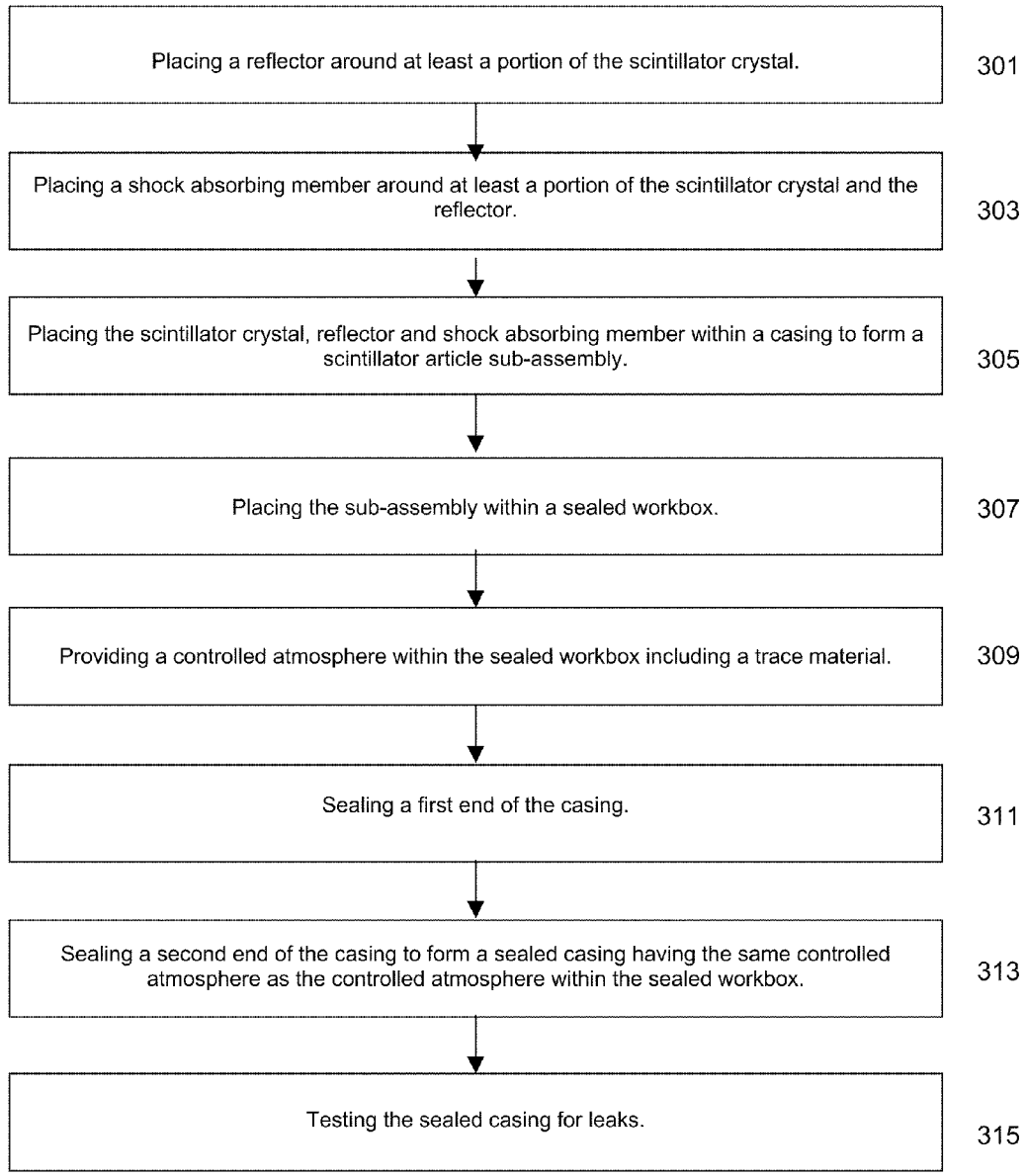
FIG. 3 includes a flow chart illustrating a method for forming a scintillation detector according to one embodiment.

Referring now to a method of forming a detector, FIG. 3 includes flow chart for assembling a scintillation detector in accordance with one embodiment. As illustrated, the process of assembling the scintillation detector can be initiated at step 301 by placing a reflector around at least a portion of the scintillator crystal. The reflector can include those materials and designs previously described and illustrated in accordance with FIG. 2.

The process of assembling the scintillation detector can continue at step 303 by placing a shock absorbing member around at least a portion of the scintillator crystal and the reflector. The shock absorbing member can include those materials and designs previously described and illustrated in accordance with FIG. 2.

After wrapping the scintillator crystal in the reflector and the shock absorbing member as provided in the previous steps, the process continues at step 305 by placing the scintillator crystal, reflector, and shock absorbing member within a casing to form a scintillation detector sub-assembly. It will be appreciated that other components, such as those illustrated in FIG. 2, may also be provided within the casing at this time and considered part of the scintillation detector sub-assembly.

After forming the sub-assembly at step 305, the process continues by placing the sub-assembly within a sealed workbox at step 307. The sealed workbox can have ports suitable for an operator to manipulate and complete tasks on the scintillation detector sub-assembly while it is contained within the sealed workbox. In one embodiment, the sealed workbox is a container capable of having a controlled atmosphere, including seals, valves, vacuum pumps, and tanks connected thereto for control of the atmosphere therein.

After placing the sub-assembly within the sealed workbox at step 307, the process continues at step 309 by providing a controlled atmosphere within the sealed workbox wherein the controlled atmosphere includes a trace gas. Provision of a controlled atmosphere can include one or more steps, including for example, a purging and evacuation processes. For example, in accordance with one embodiment, obtaining a controlled atmosphere can be initiated by removing a significant portion or substantially all of the ambient atmosphere from the sealed workbox in a purging step by forcing the ambient atmosphere out of the sealed workbox and flowing a select gas into the sealed workbox. In accordance with a particular embodiment, purging of the sealed workbox can include purging with an inert gas, such as a noble gas, for example, argon.

After sufficiently purging the ambient atmosphere from the sealed workbox, the atmosphere can be stabilized to form a controlled atmosphere having a particular combination of gases. For example, a trace gas may be added to the workbox to form a controlled atmosphere as described herein, such as a mixture including at least about 70 vol % of an inert gas and not greater than about 30 vol % of a trace gas. Moreover, in some certain embodiments, after obtaining a controlled atmosphere having the select gases, the pressure can be reduced to obtain a controlled atmosphere having a reduced pressure.

After providing a suitable controlled atmosphere at step 309, the process continues at step 311 by sealing a first end of the casing. According to one embodiment, sealing a first end of the casing can include sealing an end of the casing that includes the optical window as illustrated in FIG. 2. Notably, the sealing operation can include a welding or brazing operation, and for those embodiments utilizing helium as a trace gas, the seal formed through the welding or brazing operation is improved.

After sealing the first end of the casing at step 311, the process continues at step 313 by sealing a second end of the casing to form a sealed casing having the same controlled atmosphere as the controlled atmosphere within the sealed workbox. It will be appreciated that before sealing the second end of the casing, other components, for example a biasing member can be provided within the casing such that the scintillation detector is suitably assembled. As described previously, sealing of the second end of the casing can include a welding or brazing process. However, it will be appreciated, that in certain processes utilizing a reduced pressure atmosphere within the sealed workbox, an electron beam welding process can be completed to seal the casing.

As further illustrated in FIG. 3, after sealing the second end of the casing at step 313, the process continues at step 315 by testing the sealed casing for leaks by detecting the trace gas. It is particularly suitable that the sealed casing is tightly sealed, since the scintillator crystal is sensitive to contaminants and leaks provide access for such contaminants. As such, testing for the trace gas can include placement of the sealed casing in a testing chamber, and substantially evacuating the testing chamber atmosphere and analyzing the atmosphere for the presence of the trace gas. Preparation of the testing chamber for analysis can include purging the ambient atmosphere, such as by an evacuation procedure in which the pressure can be reduced to draw out the ambient atmosphere while the sealed casing is contained therein. After suitably purging the atmosphere within the testing chamber, atmosphere within the testing chamber can be tested for the presence of the trace gas. Because the trace gas has been purposefully incorporated into the sealed casing during the sealing process, the atmosphere of the testing chamber can be analyzed for the presence of the trace gas immediately, without an intermediate step of attempting to impregnate the sealed container with a particular gas for later analysis. The atmosphere can be analyzed using a device such as a mass spectrometer, capable of detecting minor amounts of the trace gas within the atmosphere, and therefore capable of detecting otherwise undetectable and gas permeable leaks in the casing. If the analysis detects the presence of the trace gas within the testing chamber atmosphere, it will be ascertained that the casing has a leak, and accordingly the casing can be resealed and tested again to ensure that the scintillation detector is properly formed.

Additionally, prior to conducting the leak test procedure described above, a submersion test may be performed. Generally, a submersion test includes placing the sealed container in a liquid bath and detecting the presence of a gas within the liquid, for example in the form of bubbles, which are the result of gas escaping from the sealed container indicating a sizeable leak. The submersion tests can be carried out in a liquid such as an oil, particularly mineral oil. Such a test may be conducted before the trace gas analysis since such a test is suitable for detecting large leaks, while the trace gas analysis test may not reveal a larger leak if all of the trace gas has an opportunity to escape through a large opening.

Still, in accordance with an alternative embodiment, the submersion test may be completed during the analysis of the controlled atmosphere for the trace gas. In such instances, the testing chamber may contain a liquid bath in which the sealed casing can be submerged, and during the submersion, the controlled environment of the testing chamber can be prepared and analyzed. Notably, conducting both tests simultaneously may result in improved test analysis, since preparation for elemental analysis may include reducing the pressure within the testing chamber, thus aiding manifestation of bubbles from the sealed casing and improved detectability of leaks. Moreover, combining the submersion test procedure with the analysis for the presence of a trace gas reduces the testing time and provides additional assurance that the presence of large leaks and small leaks have been investigated.

According to embodiments as described above, methods for forming scintillation devices incorporate the purposeful inclusion of a trace gas for post-fabrication detection. While prior art fabrication approaches do execute leak testing, typically such testing is limited to immersion approaches which have been discovered to offer incomplete quality control. As deployed environments continue to become more extreme, it has been found that minute leaks previously undetectable by immersion techniques have become problematic, causing device degradation.

In other art areas generally distinct from scintillation devices, helium-based leak detection has been used in sensitive environments, such as in semiconductor fabs. However, implementation of such technology generally relies on penetration of a sealed device with helium, followed by removal and detection of helium in a controlled environment. Stated another way, such approaches rely on attempted forceful helium penetration. In contrast, embodiments herein are formed to contain trace gas. This purposeful inclusion of trace gas, notably helium, has been found to improve device fabrication, by enhancing welding and the consequent hermetic seal. Such advantages are lost if the trace gas is not present during sealing.

Certain embodiments are drawn to scintillation devices containing both argon and helium. It has been found that the combination of argon and helium not only provide advantages with quality control and with provision of a quality hermetic seal as described above, but also enhances the operation of the devices. That is, it has been found that the combination of gases reduces the stabilization period required to initiate data acquisition and improves the accuracy of the data. Without wishing to be tied to any particular theory, it is believed that the combination of gases improves thermal coupling between the ambient environment and the scintillator crystal, thereby quickly stabilizing the device and the electrical gain required for data acquisition at initial calibration and during temperature shifts in use. While state of the art scintillation devices such as U.S. Pat. No. 4,764,677 teach use of inert and noble gases, such teachings are general in nature, and the working embodiments are limited to argon only. Moreover, the art does not teach the choice of argon and helium together, and does not recognize the operational advantages discovered by the present inventor.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. A method of assembling a scintillation detector comprising:
    placing a scintillator crystal in a casing;
    providing a controlled atmosphere within the casing;
    forming a sealed casing by welding or brazing so that the sealed casing contains the controlled atmosphere,
        wherein the controlled atmosphere within the sealed casing has a reduced pressure relative to standard atmospheric pressure, is different than ambient atmosphere, comprises an inert gas and a trace gas, the trace gas is in an amount of at least about 1 vol % and not greater than about 30 vol %, and the trace gas is selected from the group of materials consisting of hydrogen, helium, neon, krypton, xenon, and carbon monoxide; and
    testing the sealed casing for leaks by detecting the presence of the trace gas.

2. The method of claim 1, wherein the controlled atmosphere consists essentially of argon and helium, wherein the helium is present in an amount within a range between about 1 vol % and about 25 vol %.

3. The method of claim 1, wherein the trace gas comprises helium.

4. The method of claim 3, wherein the inert gas comprises argon.

5. The method of claim 1, wherein the controlled atmosphere has a pressure of not greater than about 100 Torr.

6. The method of claim 1, wherein testing further comprises:
    placing the sealed casing in a testing chamber having a controlled environment; and
    analyzing the controlled environment for the presence of the trace gas.

7. The method of claim 6, wherein testing further comprises a submersion test prior to testing the sealed casing in a testing chamber, the submersion test comprising:
    placing the sealed casing in a liquid bath; and
    detecting the presence of a gas escaping the sealed casing in the liquid bath.

8. The method of claim 6, wherein testing further comprises completing a submersion test during analyzing the controlled environment for the presence of a trace gas.

9. The method of claim 1, wherein forming a sealed casing having a controlled atmosphere comprises:
    forming a scintillation detector sub-assembly comprising the casing and the scintillator crystal, and further comprising a reflector and a shock absorbing member within the casing;
    placing the sub-assembly within a sealed workbox; and
    providing the controlled atmosphere within the sealed workbox wherein forming the sealed casing includes sealing the sub-assembly within the controlled atmosphere.

10. A scintillation detector comprising:
    a sealed casing comprising a welded or brazed seal, a controlled atmosphere within the sealed casing different than the ambient atmosphere, the controlled atmosphere having a reduced pressure relative to standard atmospheric pressure and comprising argon in an amount of at least about 70 vol % and helium in an amount of at least about 1 vol % and not greater than about 30 vol %; and
    a scintillator crystal disposed within the sealed casing.

11. The scintillation detector of claim 10, wherein the controlled atmosphere comprises an amount of helium within a range between about 1 vol % and about 25 vol %.

12. The scintillation detector of claim 11, wherein the controlled atmosphere comprises an amount of helium within a range between about 1 vol % and about 10 vol %.

13. The scintillation detector of claim 10, wherein the controlled atmosphere comprises argon in an amount of at least about 75 vol %.

14. The scintillation detector of claim 13, wherein the controlled atmosphere comprises argon in an amount within a range between about 75 vol % and about 99 vol %.

15. The scintillation detector of claim 10, wherein the scintillator crystal comprises a rare-earth halide crystalline material.

16. The scintillation detector of claim 10, further comprising a photomultiplier tube coupled to the scintillation detector.

17. The scintillation detector of claim 16, further comprising a light pipe disposed between the scintillation detector and the photomultiplier tube.

18. The scintillation detector of claim 17, wherein the light pipe is coupled to the photomultiplier tube and the scintillation detector using biasing members.

* * * * *